June 25, 1968 J. D. RUSSELL 3,389,459
STRAIN GAGE INSTALLATIONS
Filed Sept. 19, 1963 2 Sheets-Sheet 2

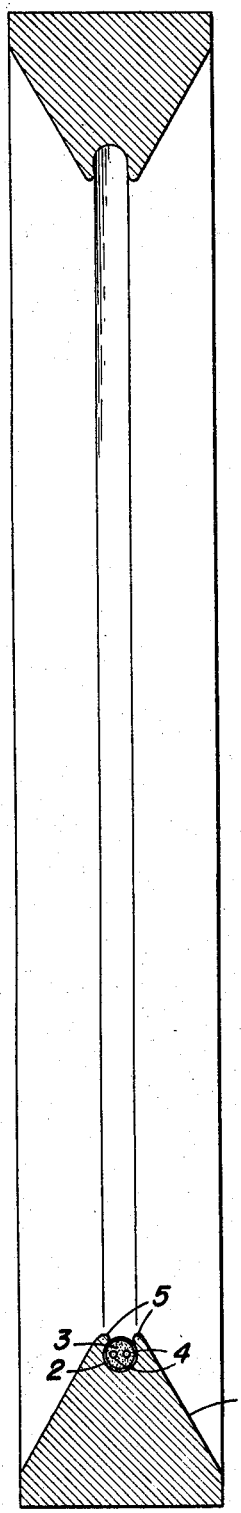
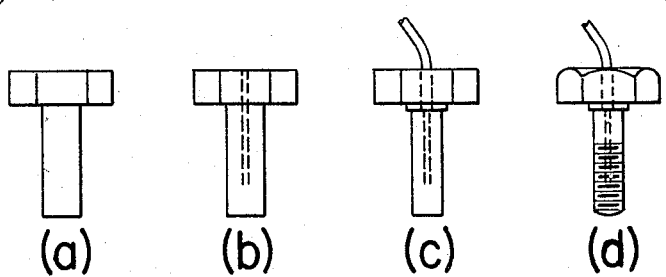
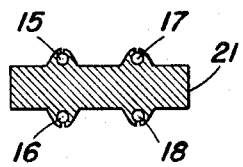
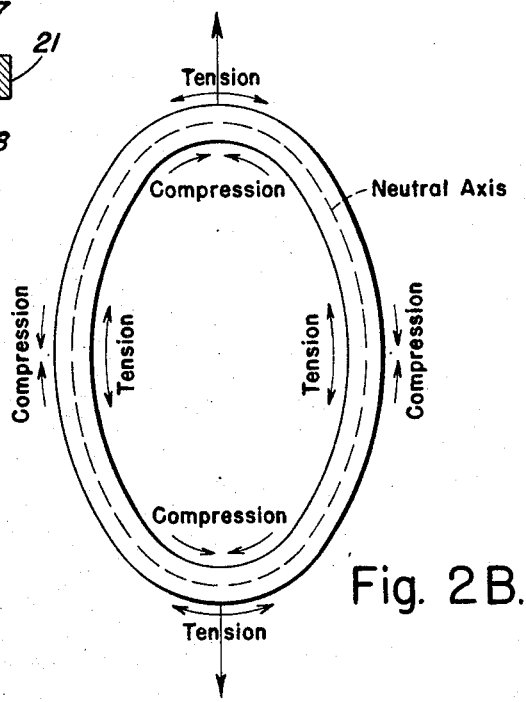
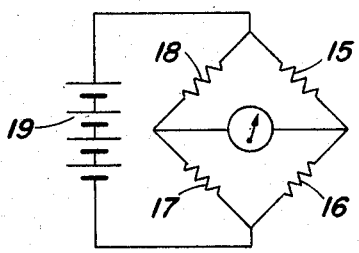
INVENTOR
John D. Russell

INVENTOR
John D. Russell
BY
Charles J. Elderkin
ATTORNEY

United States Patent Office 3,389,459
Patented June 25, 1968

3,389,459
STRAIN GAGE INSTALLATIONS
John D. Russell, Malibu, Calif., assignor to Microdot, Inc., South Pasadena, Calif., a corporation of California
Continuation-in-part of application Ser. No. 37,016, June 8, 1960. This application Sept. 19, 1963, Ser. No. 310,073
3 Claims. (Cl. 29—610)

ABSTRACT OF THE DISCLOSURE

This invention relates to improvements in the installations of strain gages into a body subjectable to stress. A strain gage consisting of a strain-sensing means having lead wires attached thereto, compactable insulating material and a closed, tubular shell is placed beneath the surface of the body which is to be subjected to stress and secured for use in that position. In a preferred embodiment of the invention the strain gage is installed into a groove cut in the surface of a force ring, and the ring is mechanically deformed adjacent the gage to elongate the gage and lock the same within the groove.

---

The present application is a continuation-in-part of patent application Ser. No. 37,016, filed June 8, 1960 (now U.S. Patent No. 3,105,139, issued Sept. 24, 1963), which was a division of application Ser. No. 754,956, filed Aug. 14, 1958, now U.S. Patent No. 3,245,018, issued Apr. 5, 1966, and which, in turn, was a continuation-in-part replacement of application Ser. No. 390,938, filed Nov. 9, 1953, and application Ser. No. 492,010, filed Mar. 3, 1955, both of the latter applications being now abandoned.

This invention relates to improvements in strain gage installations for measuring strain in a body subjected to variable stress. More particularly, the invention comprises strain gage installations wherein the gage unit is actually buried within the body subjected to the stress. The invention has particular application to such devices as pressure transducers employing force rings and the like, and may also be used for measuring strain in heavy structural members and other massive bodies where the cutting of a small groove or hole will not adversely affect the end use of the body.

In U.S. Patent No. 3,105,139 there is described and illustrated (FIGURES 8 through 10) a strain-responsive filament which is placed in a rectangular groove in either a housing or the test specimen. The filament is surrounded by suitable insulation and compacted by hammering a covering block thereover. While gages constructed in this manner have proven to give accurate results over a long period of time, they suffer from the disadvantage of having to be entirely constructed "on site." When the extremely small size of the gage, and the delicacy of the filaments—0.001 in. diameter—is considered, it can be seen that accurate and proper construction of the gage on the test specimen is both a time-consuming and painstaking task, and one which is often frustrated due to inadvertent breakage or grounding of a filament.

The present invention is based, at least in part, on the discovery that all of the foregoing disadvantages can be overcome by securing or burying a previously assembled, complete strain gage having a tubular metal shell in a groove machined in the specimen. Mechanical coupling of the gage to the specimen (or ring etc.) is accomplished by welding, brazing or, preferably, by swaging around the groove. In this manner, the specimen is mechanically (and strain-responsively) coupled to the gage shell, and this is, of course, coupled in the same manner to the filaments during the process of manufacture. Installation is thus simplified to the steps of cutting the groove, inserting the gage and welding or deforming the metal down around the gage and thereby locking it in. The mechanical deforming procedure has the additional advantage of producing very accurate gage operation with an exceptionally high degree of reliability, due to the fact that two separate increments of pressure are exerted upon the strain-sensing elements, one by the tubular shell (during manufacture) and one by the deforming operation (during installation). As explained more fully hereinbelow, this overcomes many of the inherent defects in the presently-known, surface-attached bonded and welded gage installations.

It is believed that the present invention will be more clearly understandable if some of the problems inherent in using strain gages in a pressure transducer employing a ring, links, beam or tube as the operative element are first discussed. As used herein, the term "pressure" is meant to include any physical variable such as force, pressure, torque, deflection and the like. In the conventional transducer structure, the pressure strains the ring or beam contained therein and this strain is transferred to a gage or gages attached to the surface thereof through the bond created by adhesive, welding, etc. The strain produces an electrical signal generally proportioned to the physical variable being measured and this is connected into a normal bridge circuit and measured in a conventional fashion.

While for many applications this transfer is made with acceptable accuracy, there are cases where hysteresis, nonlinearity and other factors related to the bond have resulted in unacceptable errors of measurement. In some cases, as for example where high temperatures and radiation are likely to be encountered during use, the weldable strain gage described in the aforementioned U.S. patent offers the most dependable installation. On rings or other structures which have only a very thin member to which the gage must be attached, however, the tubular steel shell of such a gage may become a significant structural part of the member thus affecting overall response to the physical force, unless the gage is extremely small. It is to be noted in this connection that the structural member of a transducer (ring, beam, etc.) should be made of a fine grade of heat-treated steel capable of operation at high strains, having a high fatigue life, and good hysteresis properties, whereas the gage itself is generally designed to be weak and pliable so as to follow the strains.

A further problem with the installation of any strain gage on relatively thin member is a shear lag effect and yielding which produces a zero shift in the gage. Thus, the bottom portion of a normal gage attached to the structure will follow the strains quite accurately, but the top of the gage may not necessarily follow the strain changes to the same degree. The foregoing is caused by the fact that in any bending structure the stresses (either compressive or tensile) increase as the distance from the neutral axis increases. The problem is further complicated in the case where a steel tube comprises part of the gage structure in that the high strains at the top of the tube (i.e. furtherest from the neutral axis) can go past the yield point of the steel so that while the bottom of the gage will return to its original position when the load on the structure is removed, the top of the tube will assume a slightly different position because it has yielded. If the second or later cycles are all in the same direction the problem will be somewhat alleviated because the top of the tube will be strained on both sides of its neutral point; in other words, the top of the tube will be under some compression after a tension load due to yielding during the first tension cycle. If the load is switched from tensile to compressive, however, then further yielding is even more likely to occur as the top of the tube is already under a compressive force. Here again, successive runs will result in less zero shift as the top of the tube tends to shift towards a residual condition (either tensile or compressive) as the successive loads of the same type are applied.

It is therefore an object of the present invention to provide a strain gage installation which substantially eliminates problems associated with shear lag and yield.

A further object of the invention is to provide a strain gage installation that is both simple to effect and reliable in operation, even when the installation is made "on site."

A still further object of the invention is to provide a strain gage installation in which the resistance of the strain-sensing means is controllable within narrow limits even after installation.

Yet another object of the invention is to provide improved pressure transducers having strain gages installed therein and which are both more accurate and more reliable than transducers presently available.

Still another object of the invention is to provide a strain-gage installation wherein the strains are transmitted to the strain-sensing means evenly and from all sides rather than just from one side.

Various other objects and advantages will appear from the following description of several embodiments of the invention, and the novel features will be particularly pointed out hereinafter in connection with the appended claims.

As noted hereinabove, the present invention involves securing a gage which is within a thin metallic shell or tube within the ring structure (or in the surface of the test specimen) so that the entire tube is forced to go along with the structure thereby eliminating any shear lag or yield problems. A further improvement in operation of gages is obtained when they are installed by mechanically deforming the surrounding metal. Two increments of pressure are thus exerted upon the gage element after its installation; a first increment is applied when the gage is manufactured by swaging the tube and thus compacting the insulation surrounding the gage element. The second increment of pressure is applied by mechanically deforming the ring structure around the gage thereby mechanically locking it in place and "squeezing" the tube surrounding the gage element. By thus burying and locking the gage within the structure, strain is transferred to all sides of the gage, whereas in the conventional installation (i.e. bonded or welded to the surface) strains are transferred only to the under-side of the gage.

A better understanding of the invention will be gained by referring to the following description of several embodiments thereof, taken in conjunction with the accompanying drawings, in which FIGURE 1 is a cross-sectional view of a preferred strain gage installation in a force-ring type of pressure transducer;

FIGURES 2A and 2B are schematic drawings illustrating the forces present in a force ring when it is subjected to compressive and tensile loads, respectively;

FIGURE 3 illustrates the typical bridge circuit arrangement for measuring the force in the transducer illustrated in FIGURE 2;

FIGURE 4 is a cross-sectional view of a deflection beam showing four gages installed therein;

FIGURES 6A–6D illustrate the installation of a strain gage in a bolt according to the invention.

Figure 2:
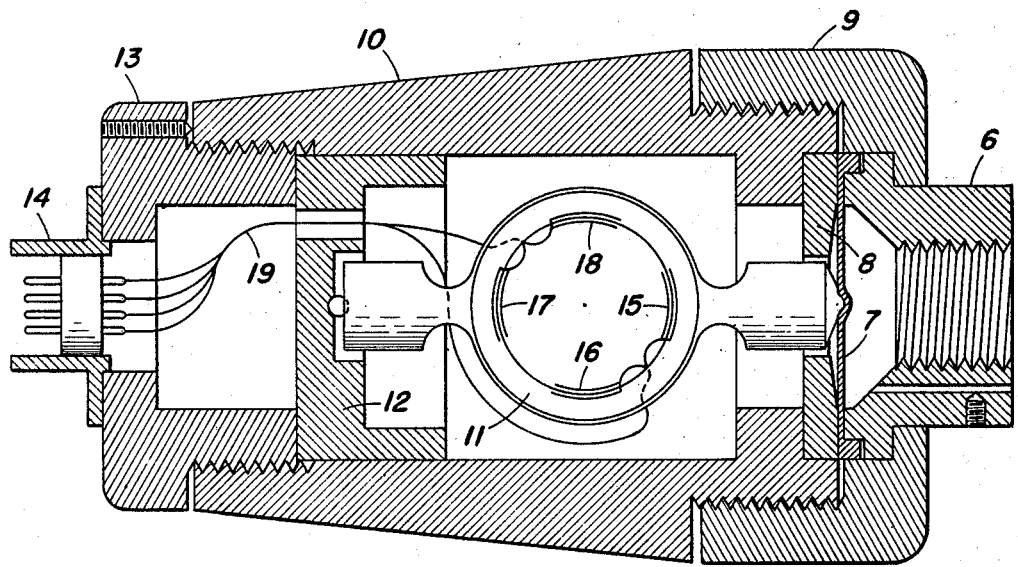
FIGURE 2 is a side view of a pressure transducer having strain gages installed therein according to the invention.

FIGURE 1 illustrates a resistance wire gage installed in accordance with the present invention. The cross-section shown is that of an improved force-ring type of pressure transducer wherein the ring itself has a partially triangular cross-section which has several advantages due to its removal of the gage to a point more distant from the neutral axis. This type of ring has the ability to be used at high strain levels, gives a better safety factor and less deflection compared to the more conventional rectangular cross-section. Thus, if an excessive load should cause yield, the ring would not be likely to fail, as the fibres closer to the neutral axis tend to take up the load. Moreover, in a ring which is to be used in one direction only, this design lends itself to a technique of deliberately yielding of the gage area to increase range through the aforementioned work-hardening process. Of course, other cross-sections (i.e. "V," "I," "T") are possible. Referring again to FIGURE 1, it will be seen that a groove is machined at the apex of the triangular cross-section of the ring 1 and the gage, consisting of a tubular shell 2, compacted insulation 3 and the resistance element 4 is inserted in said groove. The edges of the groove 5 are then plastically deformed by bending them over to lock the gage in place and exert a pressure thereon and reduce its size somewhat, in force rings of this type rotary swaging being employed to accomplish this deformation. Powdered insulation is here desirable, as it flows evenly during swaging operation. As used herein the term "tubular shell" is intended to mean a closed tube, without restriction to any particular cross-sectional shape; naturally, the cross-section may be essentially any shape.

In FIGURE 2 there is shown a side view of a pressure transducer assembly employing a force ring of the type shown in FIGURE 1 and having the gages installed as shown therein. Thus, a case 10 is provided with suitable fittings to hold the diaphragm 7, pressure chamber 6, washer 8, retainer ring 9, retainer plug 13 and connector plug 14. The force ring 11 is supported by ring support plug 12 and abuts against diaphragm 7. Gages 15, 16, 17 and 18 are installed as shown in FIGURE 1 and connected to plug 14 by means of leads 19.

Figure 2A:
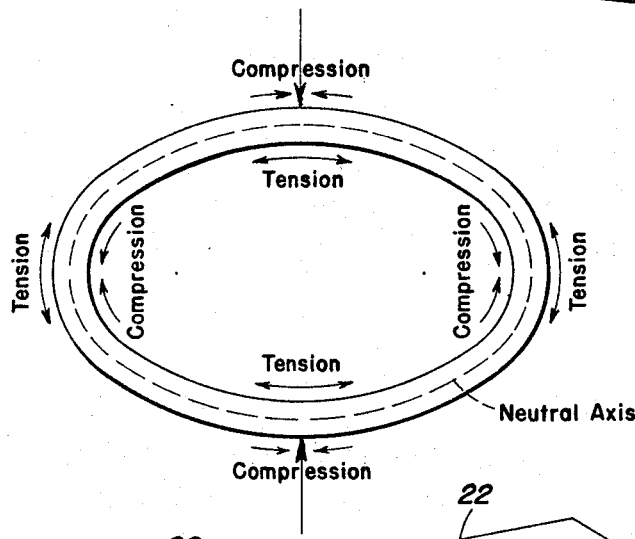

In FIGURES 2A and 2B the effects of tensile and compressive loads on the force ring of FIGURE 2 are schematically illustrated. In FIGURE 2A the ring is subjected to a compressive load and the areas of high bending stress are indicated with appropriate arrows, the neutral axis being indicated by the dotted line. As can be seen from FIGURE 2B, the situation is just reversed when a tensile load is applied. The areas of stress concentration are, of course, the preferred places to install the gages.

In FIGURE 3 there is illustrated one circuit for connecting the four gages in a bridge circuit, the numbers of the various resistances corresponding to the numbered gages in FIGURE 2. A power source 19 and indicating means 20 complete the unit. Of course, different arrangements, well known in the art, may be employed.

As it is believed to be obvious, the gage can be inserted and the two increments of pressure applied by a variety of methods of which the machined groove followed by swaging described hereinabove is only one. Thus, the ring could be cast with the gages in position and then forged to provide the plastic deformation which causes increased pressure on the gage; alternatively, the ring could be manufactured in two halves and then clamped together by any suitable joining method which would put pressure on the gage.

It should be noted that in increasing the pressure on the filament during installation as by swaging, forging, etc. the gage will be slightly elongated and a slight change in resistance will result. This is important, in that it gives the user a degree of control over the ultimate resistance of the gage by controlling the amount of deformation used in installing the same. Thus, for example, during installation the outside diameter of a gage was reduced from 0.028 inch to 0.024 inch, and the resistance of the filament was increased just about 10% (108 to 118 ohms). With this knowledge, it is thus possible to obtain an exact resistance in the installed gage, by initially swaging slightly below the desired level and then reswaging, carefully, to raise resistance one or two ohms.

FIGURE 4 illustrates how installation of strain gages may be effected in a cantilever beam subjected to deflection. The beam 21 (normally not a test specimen itself but rather a specially manufactured unit which can be applied, for example, to measure fluid flow within a pipe) is provided with four raised grooves into which gages 15, 16, 17 and 18 are inserted in the order shown and swaged. When connected in the circuit of FIGURE 3 this will measure bending and cancel tension. It will be noted that the gages in this case are just as far from the neutral axis (in this case, the center) as if they had been welded or bonded to the surface; the mechanical deformation method of locking the gages in place, however, allows strain to be transmitted to the gages around their entire circumference, with greatly improved results. In this or any of the other embodiments of the invention, the clamped gage can be even further secured by welding or brazing over the top of the swaged groove, but this is not normally necessary.

Figure 5:
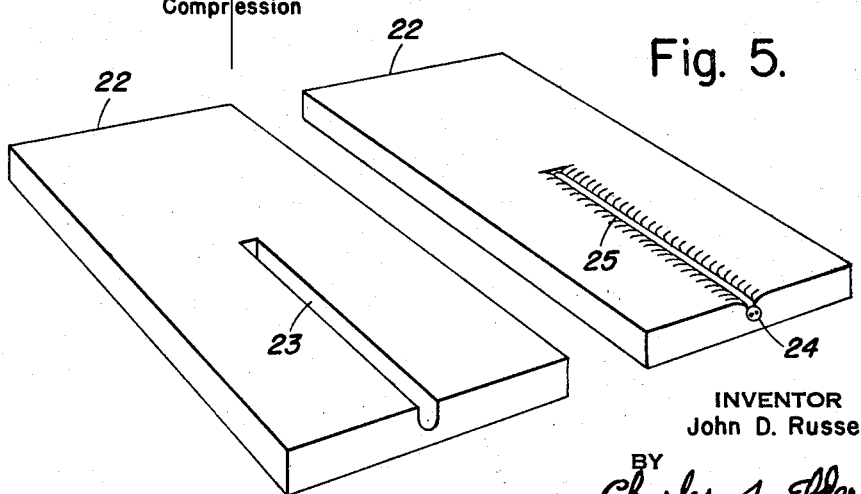
FIGURE 5 is a perspective view showing installation of a strain gage "on site" in a test specimen.

When it is desired to attach the gages directly to a test specimen, there will, of course, be no raised grooves such as are shown in FIGURE 4, unless these can be provided specifically therefor. This does not cause any great inconvenience, however, for as shown in FIGURE 5, it is only necessary to cut a groove 23 in the test specimen (22) insert gage 24 therein and plastically deform the metal around the top of the groove so that the gage is locked in, as shown at 25. As will be obvious, the groove 23 must in this embodiment be slightly deeper than in the embodiments described heretofore, so that sufficient metal will be available for deformation. Test specimen 22 can be of substantially any shape or thickness, but care must be taken so that the gage is not placed on or near the neutral axis; if the neutral axis is so near the surface as to preclude burying the gage in this manner, the configuration of FIGURE 4 is to be preferred. Alternatively, of course, the gage can be only partially buried and then brazed or welded in place.

In FIGURE 6 the steps necessary to install a strain gage in a bolt according to the invention are illustrated. A blank *a* has a small hole drilled in its center *b*, the gage (with lead wires attached) is inserted in the hole and the blank is rotary swaged so as to reduce the hole diameter and lock the gage in place *c*. Finally, the bolt is machined to its final form *d*. The bolt thus has a permanently-installed gage which is actually a part of the structure thereof.

It is to be understood that strain gage installation according to the present invention may be carried out in substantially any type of pressure transducer. For example, and in addition to the embodiments described hereinabove, the ring structure of FIGURE 1 may be installed in a larger, rectangular ring by brazing or welding along the base of the triangular portion. Two rings may be employed in a variety of ways; a primary or load-bearing ring may be installed as in FIGURE 2, with a secondary or deflection-measuring ring containing the four buried gages attached thereto, the orientation of the secondary ring depending on what strains in the primary ring it is desired to measure. Alternatively, the secondary ring may be fitted to the outside of the primary ring and at a right angle thereto, there being small balls placed between the rings at the two load points. Shapes other than rings are also useful; a spherical transducer made by joining two hemispheres has a high load range but takes only a small space. Torque shafts, various beams, links, etc. are all perfectly amenable to having the gages installed in the manner herein described.

While little has been said about the placement of lead wires in a buried gage, it will be obvious to one skilled in the art that they can be brought out through either an undeformed section of the groove or can be brought out through a hole drilled through the ring or body in which the gage is buried. In the latter event, care must be taken not to alter the structural properties of the ring by drilling of such a hole, it being well known that stresses concentrate at "notches" and are distributed evenly around a round opening. It has been found that such holes, which are very small, have no effect when placed in large force rings or the like, but in small units care should be taken to drill the holes near a point of neutral stress (i.e. 45° from a load point in a small ring).

It will be understood that various changes in the details, materials, steps and arrangements of parts, which have herein been described and illustrated in order to explain the nature of the invention, may be made by those skilled in the art within the principle and scope of the invention as expressed in the appended claims.

Having thus described the subject matter of the invention, what is desired to secure by Letters Patent is:

1. In the installation of a strain gage having a substantially tubular shell surrounding the strain-sensing means, lead wires attached to said strain sensing means, and compacted insulating material therebetween, said shell exerting pressure on said strain-sensing means through said insulation, the improvement that comprises:
providing an elongated opening in a direction for strain measurement in a plastically deformable body to be subjected to stress;
placing the gage in said opening;
plastically deforming said body and said shell to secure said gage in said opening and exert additional pressure on said strain-sensing means; and
connecting said lead wires to a resistance monitoring unit for strain measurement.

2. Process for the installation of a strain gage into a force ring, said strain gage having a substantially tubular shell surrounding the strain-sensing means, lead wires attached to said strain-sensing means, and compacted insulating material therebetween, said shell exerting pressure on said strain-sensing means through said insulation, comprising the steps of:
providing an elongated opening in said force ring at a point removed from the neutral axis thereof and in a direction for strain measurement;
placing the gage in said opening;
plastically deforming said force ring and said shell to secure said gage in said opening and exert additional pressure on said strain-sensing means; and
connecting said lead wires to a resistance monitoring unit for strain measurement.

3. The process as claimed in claim 2, wherein said opening comprises a groove in the surface of said ring, and said deformation comprises bending the edges of said groove over said gage so as to slightly elongate said gage and lock the same within said groove.

References Cited
UNITED STATES PATENTS

| | | | |
|---|---|---|---|
| 2,403,951 | 7/1946 | Ruge | 73—88.5 |
| 2,898,761 | 8/1959 | Hast | 73—88.5 X |
| 3,036,283 | 5/1962 | Singdale et al. | 73—88.5 X |
| 3,084,300 | 2/1961 | Sanchez | 73—88.5 X |
| 3,060,395 | 10/1962 | Sandven | 338—2 |
| 2,920,377 | 1/1960 | Janos | 29—155.5 |
| 3,096,566 | 7/1963 | Jepson | 29—155.5 |

FOREIGN PATENTS
720,939   12/1954   Great Britain.

JOHN F. CAMPBELL, *Primary Examiner.*

RICHARD M. WOOD, *Examiner.*

H. T. POWELL, R. W. CHURCH, *Assistant Examiners.*